Patented Sept. 28, 1926.

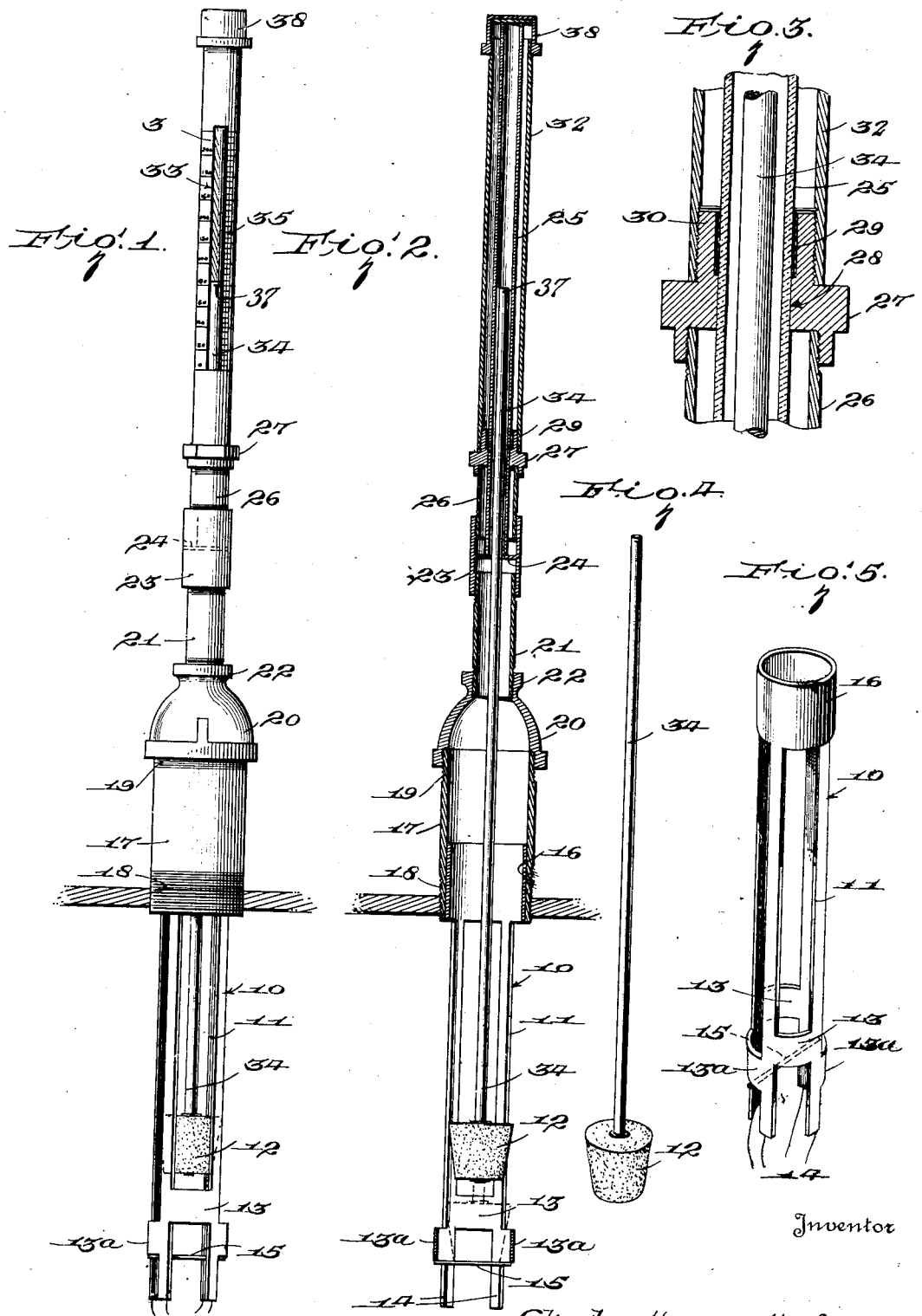

1,601,532

UNITED STATES PATENT OFFICE.

CHARLES H. KAUFMAN, OF WACO, TEXAS.

AUTOMATIC GAS GAUGE.

Application filed May 25, 1925. Serial No. 32,779.

This invention relates to a gauge for gasoline storage tanks.

Considerable difficulty is experienced in attempting to measure the quantity of gasoline which remains in large tanks located below the surface of the ground. It is usual to employ a long measuring stick for insertion into the opening of the tank thereby requiring considerable time and with a consequent loss of gas from the tank by evaporation and at the same time foreign matter escapes into the tank from the sides of the conduit in which the stick is inserted.

An object of the present invention is to provide a device which is connected to an opening in the tank and which projects above the ground at all times for indicating the exact quantity of the liquid remaining in the tank, thereby eliminating the use of measuring sticks, loss of gas and also preventing the accumulation of foreign matter in the tank.

A further object of the invention is the provision of a gauge for underground storage tanks which may be readily removed when desired and which consists of a number of parts so that the gauge may be readily disassembled and cleaned or repaired when necessary.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in elevation of a gauge constructed according to the principles of my invention.

Figure 2 is a longitudinal vertical section of the gauge.

Figure 3 is a fragmentary vertical section of a portion of the gauge.

Figure 4 is a view in perspective of the float and indicating rod.

Figure 5 is a view in perspective of the combined support and guide for the gauge and float.

Referring more particularly to the drawings, a supporting stand 10 is provided which may be of any cross sectional area but is preferably made cylindrical and having cut out portions to provide slots 11 to permit the liquid in the storage tank in which the support 10 is disposed to circulate freely through the support in order to permit a cork float 12 to float upon the liquid in the tank. Strips of metal 13 formed integrally with the support adjacent the bottom of the same provide means for maintaining the legs 14 in spaced relation. A bar or wire 15 is connected between a pair 13$^a$ of the reinforcing straps adapted to provide a rest for the float 12 when the liquid in the tank falls below a predetermined level and substantially below the wire 15.

The upper cylindrical portion 16 of the support 10 is received within a sleeve 17 which is threaded at 18 so that the sleeve may be screwed into a threaded opening in the top of the storage tank. The upper end of the sleeve is threaded at 19 to receive the threads on the inner surface of a dome-shaped connecting member 20.

A short connection or pipe 21 threaded at its opposite ends is screwed into the upper threaded reduced end 22 of the dome-shaped member 20. The other end of the pipe 21 is threaded into the lower end of the sleeve 23 which is provided with an annular flange forming a support 24 formed internally of the sleeve and adapted to support the lower end of a glass tube 25. A pipe connection 26 is threaded into the upper end of the sleeve 23 and engages the threads of a nut or union 27.

The union 27 is provided with an internal passage 28 through which passes the glass tube 25, and a packing 29 seated within the enlarged recess 30 of the union embraces the glass tube 25 to prevent the loss of gas from the storage tank. The union is threaded to engage the internally threaded portion of the lower end of a housing 32. This housing is cut away intermediate its ends as shown at 33 in order to provide a sight opening for viewing a rod 34 which is connected at its lower end to the float 12. This rod is formed of some light material so that the size of the cork float need not be of any great size for properly supporting said rod.

At one side of the slot 33 a scale 35 in inches is provided, while at the opposite side a scale 36 designating gallons is indicated. The upper end of the rod 34, is provided with a red band indicated at 37 and which cooperates with the scale 36 to indicate the number of gallons in the tank.

The extreme upper end of the housing 32 is threaded upon which is screwed a cap 38. Within the upper end of the cap 38 is provided a gasket 39 formed of felt or rubber which is adapted to engage the upper extreme end 40 of the glass tube 35 for closing the same to the atmosphere in order to prevent the loss of gas which has evaporated from the gasoline in the storage tank and which has found its way through the various connections and into the protective tube 25.

It will be seen by this construction that the gauge may be adapted for any sized tank and for any depth of the tank below the surface of the ground since the various connections 21, 23 and 26 may be varied to suit the needs of the particular container and its position in the ground. The length of the support 10 depends entirely upon the diameter or height of the storage tank since the legs 14 of the support rest upon the bottom of the tank while the upper cylindrical portion 16 is received within the sleeve 17 which is screwed into an opening in the tank. The diameter of the support 10, of course, depends upon the diameter of the float 12 and the size of such float is controlled by the length and necessarily the weight of the rod 34.

Where standard storage tanks are employed it is only necessary to determine the correct position of the red band 37 on the rod 34 with respect to the scale 33 in order to provide the correct indications of the scales in terms of gallons. Where tanks of different heights are employed it is necessary to determine in advance in each case the scale in terms of gallons and inches on the housing 32. The length of the rod 34 is only determined by the depth at which the storage tank has been disposed.

What I claim is:

1. A gauge comprising a support provided with openings, a float slidably mounted in the support, a rest on the support to maintain the float above the bottom of the support, an indicating rod connected with the float, a sleeve adapted to receive the upper end of the support and provided with threads for connection to an opening in a tank, a housing spaced from the sleeve, a hollow means for connecting the housing with said sleeve and for placing the housing in communication with said sleeve, the indicating rod being received within the hollow connecting means and extending longitudinally of the housing, said housing being provided with a longitudinal slot, the housing upon opposite sides of the slot being provided with graduations, a protective transparent tube member located within the housing and adapted to receive the indicating rod, and means at the opposite ends of the transparent member to prevent leakage of fluid past the same.

2. A gauge comprising a support provided with openings, a float slidably mounted in the support, a rest on the support to maintain the float above the bottom of the support, an indicating rod connected with the float, a sleeve adapted to receive the upper end of the support and provided with threads for connection to an opening in a tank, a housing spaced from the sleeve, a hollow means for connecting the housing with said sleeve and for placing the housing in communication with said sleeve, the indicating rod being received within the hollow connecting means and extending longitudinally of the housing, said housing being provided with a longitudinal slot, the housing upon opposite sides of the slot being provided with graduations, a protective transparent tube member located within the housing and adapted to receive the indicating rod, said transparent tube member extending into the hollow connection between the sleeve and housing, and said hollow means being provided with a support for the lower end of the transparent tube, and means at the opposite ends of the transparent tube member to prevent leakage of fluid past the same.

3. A gauge for a storage tank comprising a hollow support having longitudinal openings, a rest within the hollow support and spaced from the bottom thereof, a float within the hollow support, a sleeve having threads adapted to be screwed into the storage tank adapted to receive the upper end of the support, a dome-shaped member having its lower end threaded onto the upper end of the sleeve, a pipe threaded into the upper end of the dome-shaped member, a sleeve threaded onto the other end of the pipe, a second pipe connection threaded into the other end of the second mentioned sleeve, said sleeve being provided with an inwardly projecting flange intermediate its ends, a union threaded onto the free end of the second mentioned pipe connection and provided with an enlarged pocket, a packing located in said pocket, a transparent tubular member inserted through the union, the second mentioned pipe connection having its lower end resting upon the flange above the second mentioned sleeve, the packing in the union embracing the transparent tubular member, a housing threaded onto the union and enclosing the transparent tube and provided with a slot through which the transparent tube appears, a cap threaded onto the upper end of the housing and provided with a gasket adapted to engage the upper end of the transparent tube, a rod connected to the float and extending through the support, the first and second mentioned sleeves, the dome-shaped member and pipe connections and having its upper end movable through the transparent tubular member.

CHARLES H. KAUFMAN.